(12) United States Patent  (10) Patent No.: US 8,160,798 B2
Kettenacker  (45) Date of Patent: Apr. 17, 2012

(54) METHOD AND DEVICE FOR REGULATING THE VELOCITY OF A VEHICLE

(75) Inventor: Guenter Kettenacker, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 938 days.

(21) Appl. No.: 12/220,220

(22) Filed: Jul. 22, 2008

(65) Prior Publication Data

US 2009/0037068 A1 Feb. 5, 2009

(30) Foreign Application Priority Data

Jul. 30, 2007 (DE) .................... 10 2007 035 720

(51) Int. Cl.
 *B60K 31/00* (2006.01)
(52) U.S. Cl. ............. 701/93; 701/94; 701/110; 180/170
(58) Field of Classification Search .............. 701/93, 701/94, 110; 180/170, 178, 179
 See application file for complete search history.

(56) References Cited

U.S. PATENT DOCUMENTS

| | | | | |
|---|---|---|---|---|
| 4,157,124 | A * | 6/1979 | Poore ............................ | 180/178 |
| 4,273,208 | A | 6/1981 | Liermann | |
| 4,739,485 | A * | 4/1988 | Hayashi ........................ | 701/110 |
| 4,803,637 | A * | 2/1989 | Tada et al. .................... | 701/93 |
| 4,931,939 | A * | 6/1990 | Kawata et al. ................ | 701/93 |
| 5,623,408 | A * | 4/1997 | Motamedi et al. ............ | 701/51 |
| 2003/0212483 | A1* | 11/2003 | Folke ............................ | 701/93 |
| 2004/0073354 | A1* | 4/2004 | Hartmann et al. ............ | 701/110 |
| 2004/0088103 | A1* | 5/2004 | Itow et al. .................... | 701/110 |
| 2010/0049400 | A1* | 2/2010 | Duraiswamy et al. ........ | 701/35 |
| 2011/0125355 | A1* | 5/2011 | Ketfi-Cherif et al. ......... | 701/22 |

FOREIGN PATENT DOCUMENTS

| | | |
|---|---|---|
| DE | 28 19 175 | 11/1979 |
| DE | 43 41 212 | 4/1994 |
| DE | 44 20 116 | 12/1995 |
| DE | 102 21 341 | 11/2003 |
| EP | 0 145 374 | 6/1985 |
| EP | 0 656 276 | 6/1995 |
| EP | 715687 A1 * | 6/1996 |
| EP | 0 992 388 | 4/2000 |
| EP | 715687 B1 * | 4/2001 |
| FR | 2 424 827 | 11/1979 |
| WO | WO 95/06200 | 3/1995 |

* cited by examiner

*Primary Examiner* — Ruth Ilan
*Assistant Examiner* — Barry Gooden, Jr.
(74) *Attorney, Agent, or Firm* — Kenyon & Kenyon LLP

(57) ABSTRACT

A method and a device are described for regulating the velocity of a vehicle, which include a hysteresis function and prevent an unwanted activation and deactivation of the engine brake. For this purpose, a setpoint velocity (V-setpoint) of the vehicle is predefined. An actual velocity (V-actual) of the vehicle is detected and, as a function of the difference between the actual velocity (V-actual) and the setpoint velocity (V-setpoint), an output quantity (Msetpoint) of a drive unit of the vehicle is predefined in such a way that the actual velocity (V-actual) is approximated to the setpoint velocity (V-setpoint). A first lower limiting value (uG1) for limiting the output quantity (Msetpoint) toward the lower end is predefined as long as the actual velocity (V-actual) exceeds the setpoint velocity (V-setpoint) by less than a first predefined threshold value (offs1). When the actual velocity (V-actual) exceeds the setpoint velocity (V-setpoint) by more than the first predefined threshold value (offs1), the first lower limiting value (uG1) is replaced by a second lower limiting value (uG2) for limiting the output quantity (Msetpoint) at the lower end, this second lower limiting value being lower than the first lower limiting value (uG1).

12 Claims, 3 Drawing Sheets

METHOD AND DEVICE FOR REGULATING THE VELOCITY OF A VEHICLE

FIELD OF THE INVENTION

The present invention is directed to a method and a device for regulating the velocity of a vehicle.

BACKGROUND INFORMATION

German patent document DE 102 21 341 A1 discusses a method and a device for controlling the drive unit of a vehicle, allowing a cruise control in which operating states not desired by the driver are avoided. A setpoint quantity to be delivered by the drive unit is formed here as a function of a predefined driving velocity. The setpoint quantity to be delivered is monitored as a function of at least one operating parameter of the vehicle. A setpoint torque value is formed in the sense of regulation of a driving velocity in which the prevailing actual velocity is adjusted to the setpoint velocity value. The actual setpoint torque value is monitored as a function of the operating parameter values detected and is limited, if necessary. The actual velocity is adjusted to the setpoint velocity by the cruise control.

SUMMARY OF THE INVENTION

The method and device according to the present invention having the features of the independent claims have the advantage over the related art that a first lower limiting value is predefined for limiting the output quantity at the lower end as long as the actual velocity exceeds the setpoint velocity by less than a first predefined threshold value, and when the setpoint velocity is exceeded by the actual velocity by more than the first predefined threshold value, the first lower limiting value is replaced by a second lower limiting value, which is lower than the first lower limiting value, for limiting the output quantity at the lower end. In this way, an engine brake, which is required for returning the actual velocity to the setpoint velocity, may be activated with a time lag, thereby implementing a hysteresis for the activation of the engine brake. This is advantageous in particular when an engine brake torque may not be set continuously over the full working range but instead may be regulated only between two limiting values and otherwise cannot be set. An uncomfortable setting of the driving velocity using a two-point controller performance may be prevented in this way when precisely the braking torque that is not settable would be necessary. It is possible in this way to prevent activating and deactivating the engine brake too often.

Advantageous further refinements and improvements of the method described herein are possible through the measures further described herein.

It is advantageous if a minimum value for the output quantity that may be set without activation of an engine brake is predefined as the first lower limiting value. In this way, activation of the engine brake is effectively prevented as long as the actual velocity does not exceed the setpoint velocity by more than the first predefined threshold value.

It is also advantageous if a minimum value for the output quantity that may be set with activation of an engine brake is predefined as the second lower limiting value. This ensures that when the setpoint velocity is exceeded by the actual velocity by more than the first predefined threshold value, the maximum engine brake effect is available.

Another advantage is achieved if the first lower limiting value is replaced by the second lower limiting value only when the output quantity has reached the first lower limiting value. In this way, the activation of the engine brake is postponed as much as possible and thus a maximum hysteresis effect is achieved.

It is advantageous in particular if, on predefinition of the second lower limiting value for limiting the output quantity at the lower end, initially a first upper limiting value for limiting the output quantity at the upper end is predefined to be greater than the first lower limiting value as long as the output quantity exceeds a second upper limiting value, which is between the first lower limiting value and the second lower limiting value, and the first upper limiting value is replaced by the second upper limiting value for limiting the output quantity toward the upper end when the output quantity falls below the second upper limiting value. This prevents an activated engine brake operation from being stopped prematurely. This also prevents the engine brake operation from being activated and deactivated too often.

It is also advantageous if the second upper limiting value is replaced by the first upper limiting value when the actual velocity again falls below the setpoint velocity in particular by more than a second predefined threshold value. This enables a departure from the engine brake operation with a time lag when the actual velocity again falls below the setpoint velocity and thereby prevents the engine brake from being activated and deactivated too often in the sense of a hysteresis.

It is advantageous if the second upper limiting value is replaced by the first upper limiting value only when the output quantity has again reached the second upper limiting value. In this way, the departure from the operating state of the activated engine brake is even more reliably enabled with a time lag.

Another advantage is obtained if a value maximally adjustable in the full-load operating state is predefined as the first upper limiting value for the output quantity. Particularly for actual velocities below the setpoint velocity, this allows for the actual velocity to be adjusted to the setpoint velocity with minimal delay.

Another advantage is obtained if a value maximally adjustable when the engine brake is activated is predefined as the second upper limiting value for the output quantity. In this way, the maximum possible working range of the engine brake is utilized for the operating state of the activated engine brake on the one hand, while on the other hand, a departure from the operating state of the activated engine brake is prevented before the actual velocity again falls below the setpoint velocity. This prevents the engine brake from being activated and deactivated too often.

Another advantage is obtained if the second lower limiting value is replaced by a third lower limiting value equal to or greater than the first lower limiting value, when the output quantity reaches or exceeds the third lower limiting value. This ensures that when the actual velocity falls below the setpoint velocity, the operating state of the activated engine brake is abandoned and thus an adjustment of the actual velocity to the setpoint velocity is not prevented or made difficult.

It is advantageous here if a neutral value, in particular the value zero, is predefined as the third lower limiting value. In this way, it is ensured that the engine brake will not be activated in the case when the actual velocity falls below the setpoint velocity. If the value zero is predefined for the third lower limiting value, it is ensured that no negative value for the output quantity may be predefined for an actual velocity lower than the setpoint velocity, so that an adjustment of the actual velocity to the setpoint velocity is ensured.

An exemplary embodiment of the present invention is depicted in the drawing and described in greater detail in the following description.

DETAILED DESCRIPTION

Figure 1:
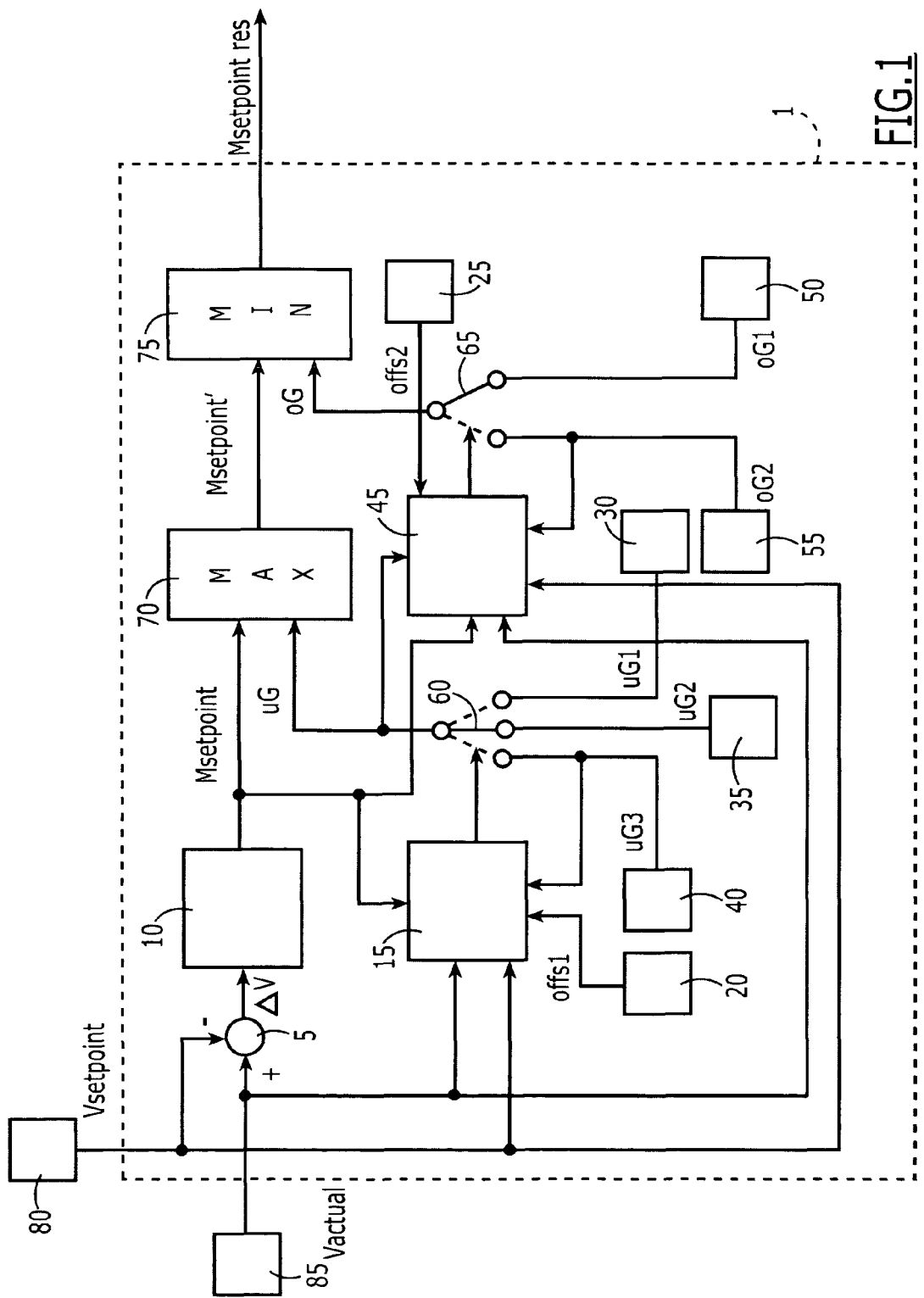
FIG. 1 shows a function chart to illustrate the device according to the present invention.

FIG. 1 shows a device 1 according to the present invention for regulating the velocity of a vehicle, which may be implemented in software and/or hardware in an engine controller of the vehicle, for example. However, as shown in FIG. 1, device 1 may also be designed as an independent control unit for regulating the velocity of the vehicle. A setpoint velocity V-setpoint is sent to device 1 from a setpoint preselection unit 80. Setpoint preselection unit 80 may be, for example, a cruise control lever on which the driver of the vehicle enters setpoint velocity V-setpoint in a manner known to those skilled in the art. Furthermore, device 1 receives prevailing actual velocity V-actual of the vehicle from a velocity sensor 85.

In a subtraction unit 5 of device 1, setpoint velocity V-setpoint is subtracted from actual velocity V-actual. Resulting velocity difference Δv=V-actual−V-setpoint at the output of subtraction unit 5 is sent to a first preselection unit 10. First preselection unit 10 is a controller that may include, for example, a proportional component and/or an integral component and/or a differential component. Controller module 10 generates a setpoint value for an output quantity of a drive unit of the vehicle as a function of velocity difference Δv supplied to it in such a way that actual velocity V-actual is adjusted and/or approximated to setpoint velocity V-setpoint.

The drive unit may include, for example, an internal combustion engine or an electric motor or a hybrid drive composed of an internal combustion engine and an electric motor. The output quantity may be, for example, a torque, a power, a combustion chamber charge (in the case of using an internal combustion engine), a degree of opening of the throttle valve (in the case of a gasoline engine) or a fuel quantity to be injected (in the case of a diesel engine). In the following discussion, it is assumed as an example that the output quantity is a torque, so that the setpoint value formed by controller module 10 for the output quantity is a setpoint torque Msetpoint. The torque may be, for example, the indicated torque of an internal combustion engine. Setpoint value Msetpoint for the torque of the drive unit is then converted in a manner known to those skilled in the art by a corresponding adjustment of the air supply and/or the fuel supply and/or the ignition—in the case of a gasoline engine. Setpoint value Msetpoint for the torque, which is also referred to below as the setpoint torque, is sent to a maximum selection element 70. It is also sent together with setpoint velocity V-setpoint and actual velocity V-actual to a second preselection unit 15. A first predefined threshold value offs1 is also sent to second preselection unit 15 from a first threshold value memory 20, and a third lower limiting value uG3 is also sent from a third preselection module 40. The output quantity of second preselection unit 15 controls a first controlled switch 60, which optionally connects output uG1 of a first preselection module 30, output uG2 of a second preselection module 35 or output uG3 of third preselection module 40 to another input uG of maximum selection element 70.

Figure 3:
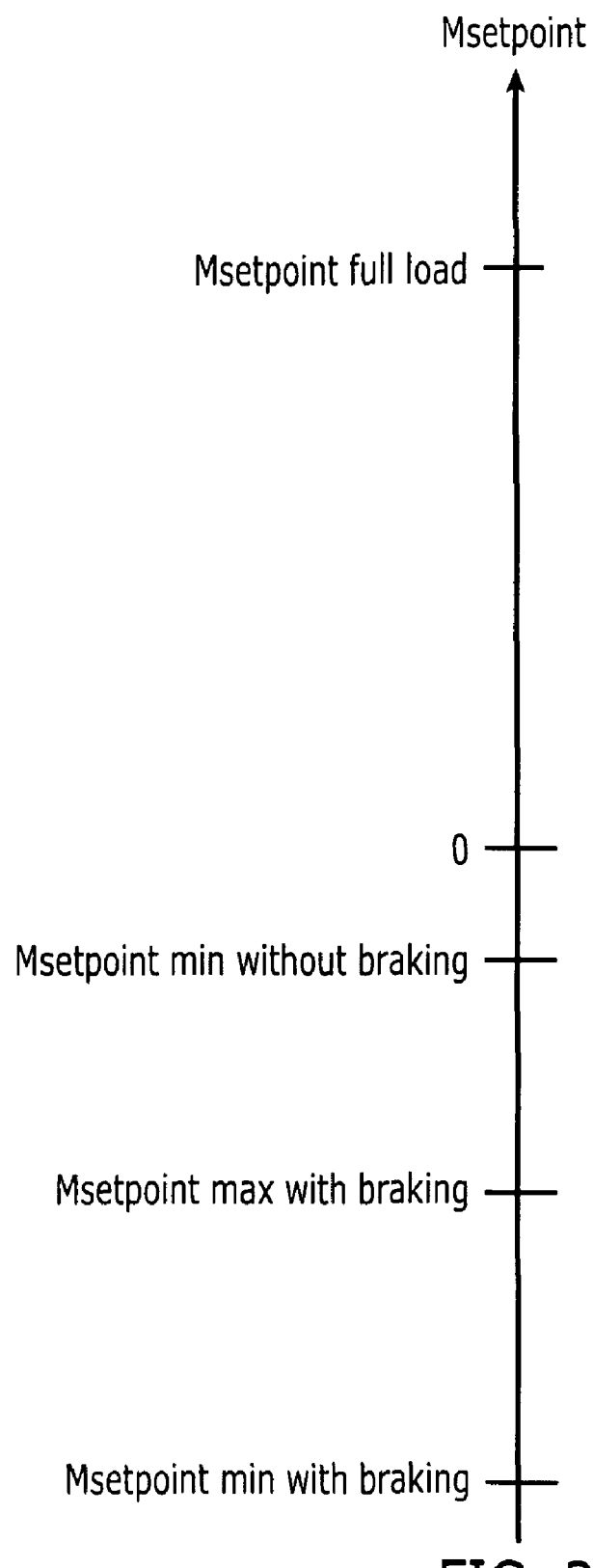
FIG. 3 shows a setpoint torque line.

The output of first preselection module 30 represents a first lower limiting value uG1 and the output of second preselection module 35 represents a second lower limiting value uG2. For example, a minimum value Msetpoint-min-without-braking, adjustable without activation of an engine brake and applied, for example, on a test bench for the particular prevailing operating situation, may be predefined as first lower limiting value uG1 for setpoint torque Msetpoint, as shown in FIG. 3. Minimum value Msetpoint-min-without-braking for setpoint torque Msetpoint that is adjustable without activation of the engine brake is less than zero in this instance. It represents the absolute value of the maximum engine brake torque that may be set without activation of the engine brake. The engine brake is activated, for example, with the help of a so-called decompression valve brake in a manner known to those skilled in the art, in such a way that an exhaust valve of one or more cylinders is opened at top dead center of the piston after compression. Therefore the work performed in compression is exhausted as heat in the exhaust line, this output and thus the engine brake effect being further increasable by increasing the charging pressure in the case of a supercharged internal combustion engine. Furthermore, the engine brake effect is increased with an increase in the number of exhaust valves of different cylinders opened at the top dead center of the piston after compression. Alternatively, the engine brake may also be implemented with the help of one or more throttle valves in the exhaust line, these throttle valves being activated in the closing direction for activation of the engine brake. The maximum engine brake torque Msetpoint-min-without-braking that may be adjusted without activating the engine brake is then the minimally adjustable torque of the drive unit that is still adjustable in the presence of the decompression valve brake without opening the exhaust valve of one or more cylinders and thus by the engine brake effect at the prevailing gear ratio.

Second lower limiting value uG2 may be predefined, for example, as a minimum value Msetpoint-min-with-braking for setpoint torque Msetpoint adjustable when the engine brake is activated, e.g., by application on a test bench for the particular prevailing operating situation. This value is illustrated in FIG. 3 as the lowest possible setpoint torque on the torque line and is thus even lower than the Msetpoint-min-without-braking value. Third lower limiting value uG3 may be predefined as a neutral value, i.e., as a setpoint torque at which there is neither an engine brake effect nor a propulsion torque. Third lower limiting value uG3 may be the value zero, for example, which is thus greater than the Msetpoint-min-without-braking value according to the torque line in FIG. 3. Third preselection module 40 may also be designed as a read-only memory in which the value zero is stored for third lower limiting value uG3. The output of first controlled switch 60 is then sent as a resulting lower limiting value uG to maximum selection element 70.

Thus, depending on the switch setting of first controlled switch 60, either first lower limiting value uG1 or second lower limiting value uG2 or third lower limiting value uG3 is sent to maximum selection element 70 as lower limiting value uG.

In a simplified specific embodiment, third preselection module 40 may also be omitted, and instead of third lower limiting value uG3, first lower limiting value uG1 from first preselection module 30 may be used.

Maximum selection element 70 selects the larger of the two values Msetpoint and uG and forwards it as first resulting setpoint torque Msetpoint' to a minimum selection element 75 of device 1. Device 1 also includes a third preselection unit 45, which, in addition to setpoint velocity V-setpoint and actual velocity V-actual, also receives signal uG at the output of first controlled switch 60 and setpoint torque Msetpoint. Furthermore, third preselection unit 45 receives a second upper limiting value uG2 from a fifth preselection module 55 and a second predefined threshold value offs2 from a second threshold value memory 25. Third preselection unit 45 forms an output signal as a function of the input quantities mentioned above for triggering a second controlled switch 65, which optionally forwards output uG1 of a fourth preselection module 50 or second upper limiting value uG2 of fifth preselection module 55 as upper limiting value oG to minimum selection element 75. Output signal oG1 of fourth preselection module 50 represents a first upper limiting value. For example, a value Msetpoint-full-load, which is the maximum adjustable value in a full-load operating state, may be predefined as the first upper limiting value oG1 for setpoint torque Msetpoint. This may be predefined by fourth preselection module 50 as a function of the prevailing operating state, e.g., prevailing engine rotational speed and prevailing engine load of the drive unit, the relationship between the maximum adjustable value Msetpoint-full-load in the full-load operating state, the engine rotational speed and the engine load being applicable on a test bench, for example. According to FIG. 3, the maximum adjustable value in full-load operating state Msetpoint-full-load is greater than zero and represents the maximum adjustable setpoint torque in the prevailing operating state.

As second upper limiting value oG2 for the setpoint torque, fifth preselection module 55 may predefine, for example, a value Msetpoint-max-with-braking, maximally adjustable when the engine brake is activated and applied, for example, on a test bench for the particular prevailing operating situation This value is then between the values Msetpoint-min-without-braking and Msetpoint-min-with-braking as also shown on the torque line in FIG. 3.

At the output of second controlled switch 65, either first upper limiting value oG1 or second upper limiting value oG2 is applied to the input of minimum selection element 75 as the resulting upper limiting value oG, depending on the switch setting. Minimum selection element 75 selects the smaller of the two values, Msetpoint' and oG, and forwards it as total resulting setpoint torque Msetpoint-res for implementation with air supply, fuel supply and/or ignition, if necessary, to corresponding modules in device 1 or to a control unit that is separate from device 1.

Figure 2:
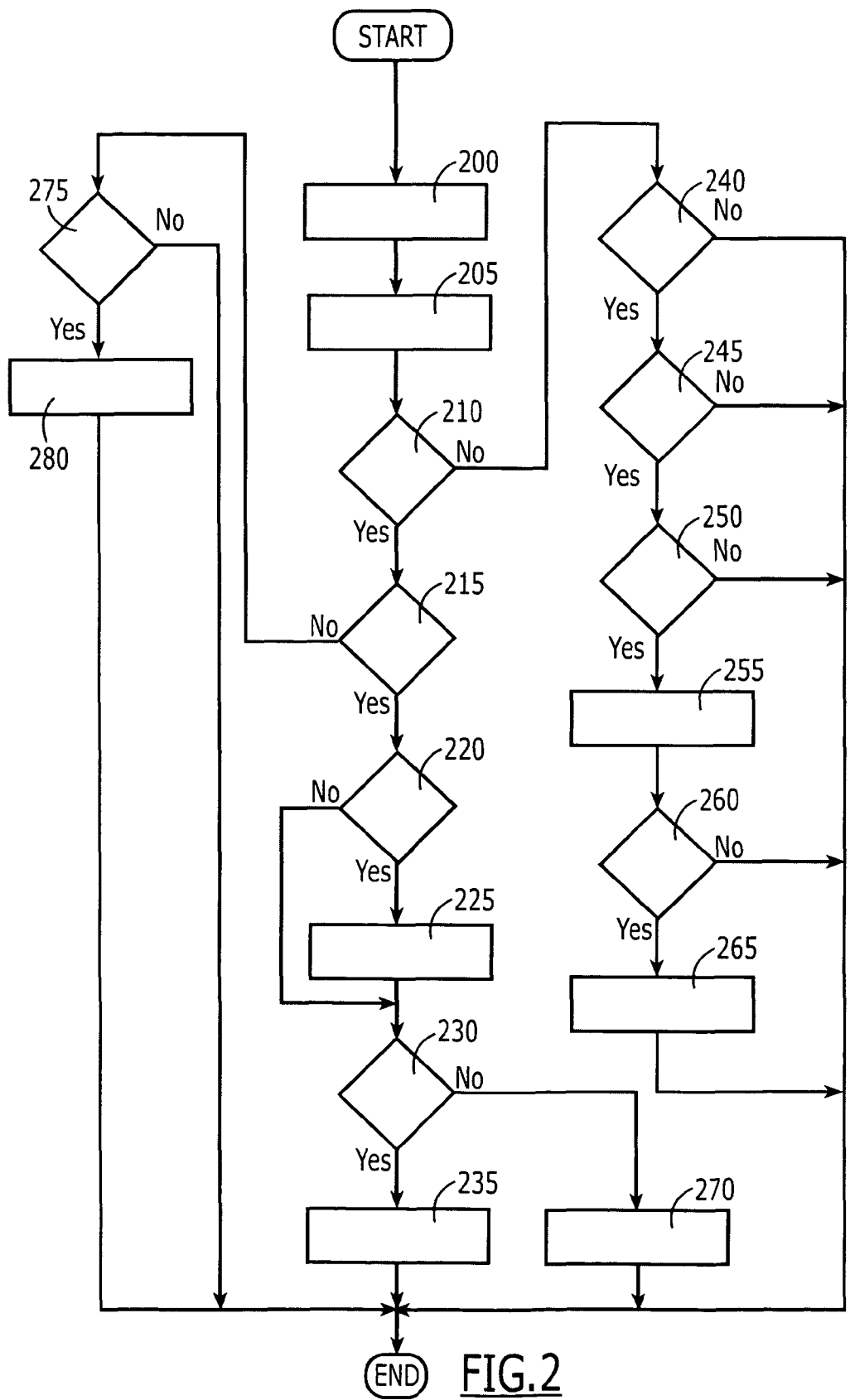
FIG. 2 shows a flow chart for an exemplary sequence of the method according to the present invention.

On the basis of the flow chart according to FIG. 2, the triggering of first controlled switch 60 and second controlled switch 65 by second preselection unit 15 and third preselection unit 45 will now each be explained as a function of their input quantities as an example.

After the start of the program, at a program point 200 setpoint velocity V-setpoint is predefined by setpoint preselection unit 80 and prevailing actual velocity V-actual is detected by velocity sensor 85. The system then branches off to a program point 205.

At program point 205, subtraction element 5 forms velocity difference Δv and first preselection unit and/or controller module 10 ascertains setpoint torque Msetpoint as a function of velocity difference Δv. The program then branches off to a program point 210.

At program point 210, second preselection unit 15 checks as to whether actual velocity V-actual is greater than setpoint velocity V-setpoint. If this is the case, then the system branches off to a program point 215; otherwise it branches off to a program point 240.

At program point 215, second preselection unit 15 checks as to whether actual velocity V-actual is greater than the sum of setpoint velocity V-setpoint and first predefined threshold value offs1. If this is the case, the system branches off to a program point 220; otherwise it branches off to a program point 275.

At program point 220, second preselection unit 15 checks as to whether it is currently triggering first controlled switch 60 in such a way that uG=uG1 or uG=uG3. If this is the case, the system branches off to a program point 225; otherwise it branches off to a program point 230.

At program point 225, second preselection unit 15 prompts first controlled switch 60 to connect second preselection module 35 to maximum selection element 70 and thus to predefine lower limiting value uG as second lower limiting value uG2. The system then branches off to a program point 230.

At program point 230, third preselection unit 45 checks as to whether setpoint torque Msetpoint is less than second upper limiting value oG2. If this is the case, the system branches off to a program point 235; otherwise it branches off to a program point 270.

At program point 235, third preselection unit 45 prompts second controlled switch 65 to connect the output of fifth preselection module 55 to minimum selection element 75, so that upper limiting value oG is selected as second upper limiting value oG2. The system then exits the program.

At program point 270, third preselection unit 45 prompts second controlled switch 65 to connect fourth preselection module 50 to minimum selection element 75, so that first upper limiting value oG1 is used as upper limiting value oG. The system then exits the program.

At program point 240, third preselection unit 45 checks as to whether actual velocity V-actual is less than setpoint velocity V-setpoint minus second predefined threshold value offs2, i.e., whether V-actual is less than V-setpoint−offs2. If this is the case, the system branches off to a program point 245; otherwise it exits the program.

At program point 245, third preselection unit 45 checks as to whether second controlled switch 65 is currently being triggered such that second upper limiting value oG2 is used as upper limiting value oG. If this is the case, the system branches off to a program point 250; otherwise it exits the program.

At program point 250, third preselection unit 45 checks as to whether setpoint torque Msetpoint is greater than or equal to upper limiting value oG and thus greater than or equal to second upper limiting value oG2. If this is the case, the system branches off to a program point 255; otherwise it exits the program.

At program point 255, third preselection unit 45 triggers the second controlled switch to connect fourth preselection module 50 to minimum selection element 75, so that upper limiting value oG is set to be equal to first upper limiting value oG1. The system then branches off to a program point 260.

At program point 260, second preselection unit 15 checks as to whether setpoint torque Msetpoint is greater than or equal to third lower limiting value uG3. If this is the case, the system branches off to a program point 265; otherwise it exits the program.

At program point 265, second preselection unit 15 prompts first controlled switch 60 to connect third preselection module 40 to maximum selection element 70, so that third lower limiting value uG3 is selected as lower limiting value uG. The system then exits the program.

At program point 275, second preselection unit 15 checks as to whether first controlled switch 60 is currently being triggered in such a way that third lower limiting value uG3 is provided as lower limiting value uG. If this is the case, the system branches off to a program point 280; otherwise it exits the program.

At program point 280, second preselection unit 15 prompts first controlled switch 60 to connect first preselection module 30 to maximum selection element 70, so that first lower limiting value uG1 is predefined as lower limiting value uG. The system then exits the program.

First lower limiting value uG1 is preselected by first preselection module 30 and second upper limiting value oG2 by fifth preselection module 55 respectively before the engine brake is activated. This preselection is then retained until setpoint torque Msetpoint has exceeded the value zero again. For renewed onset of the engine brake operation, first lower limiting value uG1 and second lower limiting value oG2 are then determined again as described above, starting from the prevailing operating situation, i.e., starting from the prevailing transmission gear. i.e., the prevailing gear ratio.

First predefined threshold value offs1 and second predefined threshold value offs2 are applied as positive values. First predefined threshold value offs1 and second predefined threshold value offs2 are each applied as a fixed value. Alternatively, application as a fixed percentage value of setpoint velocity V-setpoint is also possible, so that first predefined threshold value offs1, for example, and/or second predefined threshold value offs2 should generally amount to 5% of setpoint velocity V-setpoint. Predefined threshold values offs1, offs2 may be different but may also be selected to be the same or simplifying. In the latter case, only a single threshold value memory is required, its contents being sent to both second preselection unit 15 and third preselection unit 45.

According to the exemplary embodiment described here, through cruise control it is thus possible for an engine brake torque to be requested by the cruise control as setpoint torque Msetpoint and also for setpoint velocities V-setpoint, which require an engine brake activation for implementation, to be regulated. In the example according to FIG. 3, the engine brake torque cannot be adjusted continuously over the full operating range but instead only between the Msetpoint-max-with-braking and Msetpoint-min-with-braking values. However, setpoint torques in the form of engine brake torques cannot be set between the Msetpoint-min-without-braking value and the Msetpoint-max-with-braking value. However, the method and the device according to the present invention permit implementation of a hysteresis which prevents activation and deactivation of the engine brake due to the engine brake torque not being settable between the Msetpoint-min-without-braking value and the Msetpoint-max-with-braking value. With the device and the method according to the present invention, cruise control is shifted into a range in which continuous regulation is possible without troublesome repeated activation and deactivation of the engine brake, this being accomplished on the basis of the preselection of lower limiting value uG and upper limiting value oG for setpoint torque Msetpoint, even for the case when a value between the Msetpoint-min-without-braking value and the Msetpoint-max-with-braking value would be predefined by controller module 10 as setpoint torque Msetpoint.

According to a refinement of the flow chart according to FIG. 2, it is possible for second preselection unit 15 to additionally check at program point 215 as to whether setpoint torque Msetpoint has reached currently valid lower limiting value uG=uG1. Further branching to program point 220 then occurs only when both this first lower limiting value uG1 has been reached by setpoint torque Msetpoint and actual velocity V-actual is greater than the sum of setpoint velocity V-setpoint and first predefined threshold value offs1. Otherwise the system branches off to program point 275 as described. In this way, activation of the engine brake is postponed as long as possible, thus allowing the maximum hysteresis effect.

What is claimed is:

1. A method for regulating a velocity of a vehicle, the method comprising:
predefining a setpoint velocity of the vehicle;
detecting an actual velocity of the vehicle;
predefining, as a function of a difference between the actual velocity and the setpoint velocity, an output quantity of a drive unit of the vehicle so that the actual velocity is approximated to the setpoint velocity;
predefining a first lower limiting value to limit the output quantity at a lower end as long as the actual velocity exceeds the setpoint velocity by less than a first predefined threshold value; and
replacing, when the setpoint velocity is exceeded by the actual velocity by more than the first predefined threshold value, the first lower limiting value with a second lower limiting value, which is lower than the first lower limiting value, to limit the output quantity at the lower end.

2. The method of claim 1, wherein a minimum value, which is adjustable without activation of an engine brake, is predefined as the first lower limiting value for the output quantity.

3. The method as recited of claim 1, wherein a minimum value, which is adjustable when an engine brake is activated, is predefined as the second lower limiting value for the output quantity.

4. The method of claim 1, wherein the first lower limiting value is replaced by the second lower limiting value only when the output quantity has reached the first lower limiting value.

5. The method of claim 1, wherein when the second lower limiting value is predefined for limiting the output quantity at the lower end, a first upper limiting value for limiting the output quantity at an upper end is predefined to be greater than the first lower limiting value as long as the output quantity exceeds a second upper limiting value, which is between the first lower limiting value and the second lower limiting value, and when the output quantity falls below the second upper limiting value, the first upper limiting value is replaced by the second upper limiting value for limiting the output quantity at the upper end.

6. The method of claim 5, wherein the second upper limiting value is replaced by the first upper limiting value when the actual velocity falls below the setpoint velocity by more than a second predefined threshold value.

7. The method of claim 6, wherein the second upper limiting value is replaced by the first upper limiting value only when the output quantity has reached the second upper limiting value.

8. The method of claim 7, wherein a maximally adjustable value in a full-load operating state is predefined as the first upper limiting value for the output quantity.

9. The method of claim 8, wherein the maximally adjustable value when an engine brake is activated is predefined as the second upper limiting value for the output quantity.

10. The method as of claim 1, wherein the second lower limiting value is replaced by a third lower limiting value which is greater than or equal to the first lower limiting value when the output quantity has reached or exceeded the third lower limiting value.

11. The method of claim 10, wherein a neutral value, which is the value zero, is predefined as the third lower limiting value.

12. A device for regulating a velocity of a vehicle, comprising:
- a difference forming arrangement to form a difference between a predefined setpoint velocity of the vehicle and a detected actual velocity of the vehicle;
- a first preselection arrangement to predefine an output quantity of a drive unit of the vehicle as a function of the difference so that the actual velocity approximates the setpoint velocity;
- a second preselection arrangement to predefine a first lower limiting value for limiting the output quantity at a lower end as long as the actual velocity exceeds the setpoint velocity by less than a first predefined threshold value, and to replace the first lower limiting value with a second lower limiting value, which is lower than the first lower limiting value, to limit the output quantity at the lower end when the setpoint velocity is exceeded by the actual velocity by more than the first predefined threshold value.

* * * * *